United States Patent [19]

Kuroiwa et al.

[11] 4,398,522
[45] Aug. 16, 1983

[54] INTAKE HEATING DEVICE OF AN INTERNAL COMBUSTION ENGINE

[75] Inventors: Yosio Kuroiwa; Keigo Kato, both of Toyota; Masahisa Ando, Aichi, all of Japan

[73] Assignee: Toyota Jidosha Kabushiki Kaisha, Toyota, Japan

[21] Appl. No.: 326,202

[22] Filed: Dec. 1, 1981

[30] Foreign Application Priority Data

Dec. 4, 1980 [JP] Japan .......................... 55-173194[U]

[51] Int. Cl.³ ........................................... F02M 31/00
[52] U.S. Cl. .................................. 123/549; 261/142; 123/145 R; 219/206
[58] Field of Search ................ 123/549, 552; 261/142; 219/205, 206, 207, 306, 307, 548

[56] References Cited

U.S. PATENT DOCUMENTS

| 1,472,233 | 10/1923 | Taylor | 123/549 |
| 4,308,845 | 1/1982 | Sarto | 123/549 |
| 4,327,697 | 5/1982 | Wada | 123/549 |
| 4,361,125 | 11/1982 | Igashira | 123/549 |
| 4,362,142 | 12/1982 | Igashira | 123/549 |
| 4,366,798 | 1/1983 | Goto | 123/549 |

Primary Examiner—Ronald H. Lazarus
Attorney, Agent, or Firm—Kenyon & Kenyon

[57] ABSTRACT

An intake heating device of an engine, comprising a hollow heater vessel placed in the intake passage. The heater vessel comprises an inner pipe, an outer pipe, and a plurality of PTC elements inserted between the inner pipe and the outer pipe. The outer wall of the inner pipe is surrounded by a belt-like insulating member having a plurality of rectangular holes. The PTC elements are inserted into the rectangular holes and held in a predetermined position by the insulating member.

11 Claims, 29 Drawing Figures

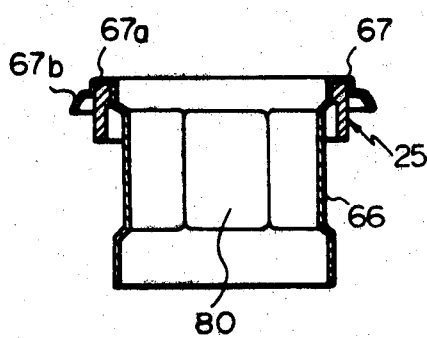
Fig. 26i
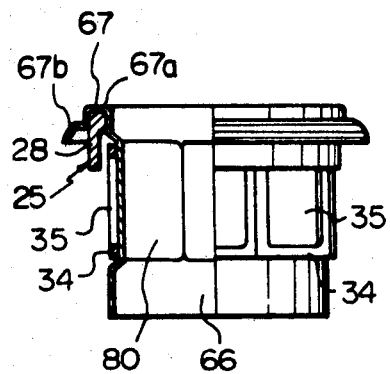
Fig. 26j
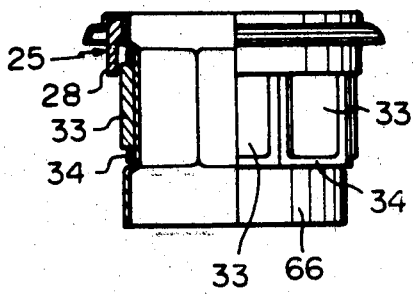
Fig. 26k
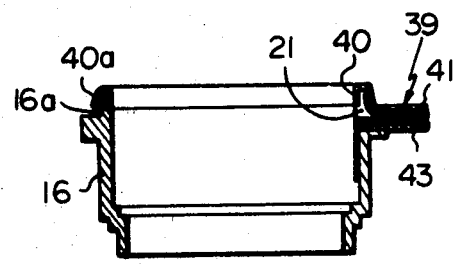
Fig. 26ℓ

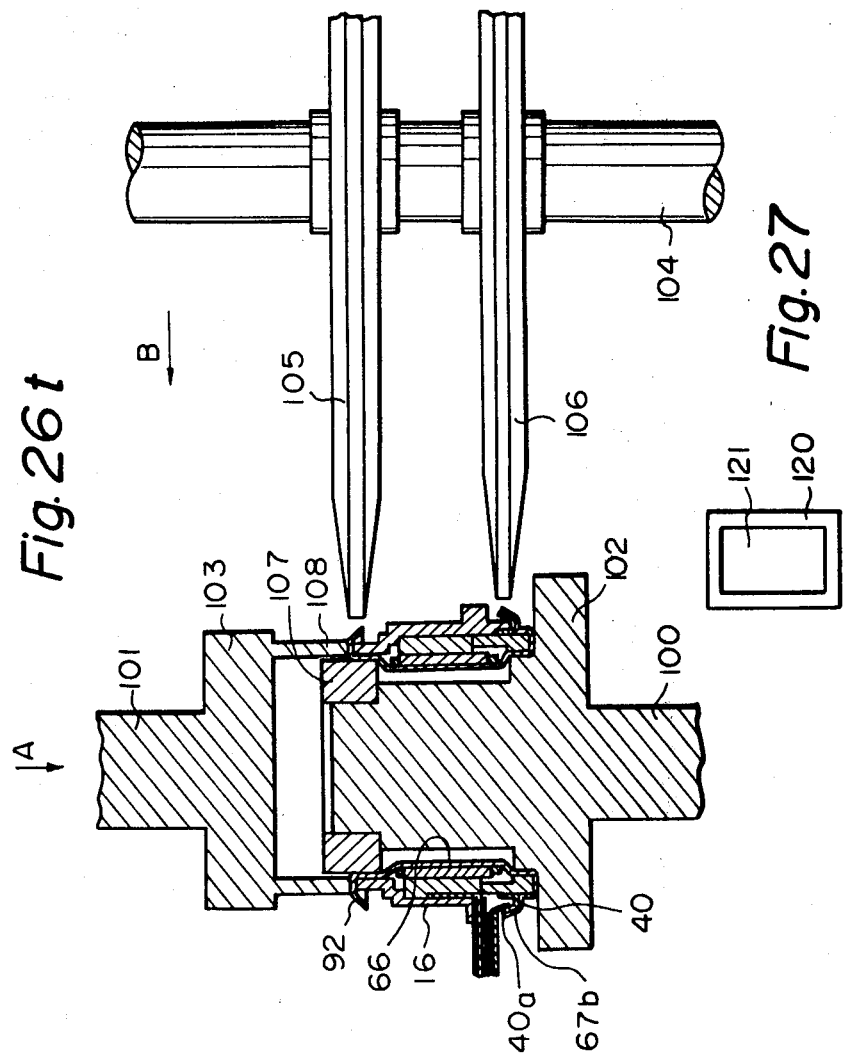

INTAKE HEATING DEVICE OF AN INTERNAL COMBUSTION ENGINE

BACKGROUND OF THE INVENTION

The present invention relates to an apparatus for promoting the vaporization of liquid fuel in an internal combustion engine.

The low engine temperature before completion of engine warm-up results in insufficient vaporization of the fuel supplied from the carbureter. The supply of a large quantity of the fuel into the engine cylinders in the liquid state, results in poorer than after completion of warm-up, whereby stable operation of the engine cannot be obtained. Accordingly, during warm-up, an air-fuel mixture which is richer than the air-fuel mixture used after completion of warm-up is supplied into the engine cylinders so as to maintain stable engine operation. However, the supply of such a richer air-fuel mixture to the engine cylinder causes not only an increase in the amount of poisonous components such as unburnt hydrocarbons HC and carbon monoxide gas CO in the exhaust but also the reduction of the fuel consumption. Accordingly, the sufficient vaporization of the liquid fuel supplied from the carburetor during engine warm-up would enable stable engine operation even with a reduced air-fuel mixture. The use of such a reduced air-fuel mixture would allow the control of the formation of poisonous components in the exhaust gas and the increase of the fuel consumption. We previously proposed an intake heating apparatus for promoting vaporization of a liquid fuel during engine warm-up, which comprises a hollow heating element vessel attached to, for example, the outlet portion of a carbureter air horn, said hollow heating element vessel including an inner pipe, an outer pipe, and a plurality of positive temperature coefficient thermistors (hereinafter referred to as "PTC elements") inserted between the inner and outer pipes, wherein the inner pipe of the hollow heating element vessel is heated by heating the PTC elements. In this intake heating apparatus, in order to prevent formation of short circuits by electric contact between the front surface and back surface of the PTC element and also to prevent cracking of the PTC elements by oscillation, an insulating member is inserted in the gap between adjacent PTC elements, or a resinous adhesive is filled in the gap between the adjacent PTC elements. However, the insertion of insulating members or filling of resinous adhesive are time- and labor-consuming operations and lack reliability, therefore making an such intake heating apparatus not satisfactory for practical purposes.

SUMMARY OF THE INVENTION

An object of the present invention is to provide a very practical intake heating apparatus in which insulation among PTC elements and maintenance of PTC elements can be accomplished very easily and assuredly.

The present invention provides for a hollow heater vessel of an internal combustion engine, which is placed in an intake passage between fuel supply means and a cylinder, said hollow heater vessel comprising: an inner pipe having therein a mixture passage which is aligned with the intake passage; an outer pipe radially spaced from and surrounding said inner pipe; a plurality of PTC elements, each being inserted between said inner pipe and said outer pipe, having an outer wall and having an inner wall which is in contact with the outer wall of said inner pipe, and; an insulating means inserted between said inner pipe and said outer pipe and having at least one hole which receives therein one of said PTC elements and has a contour shape substantially equal to that of said PTC elements.

The present invention may be more fully understood from the description of preferred embodiments of the invention set forth below, together with the accompanying drawings.

BRIEF DESCRIPTION OF THE DRAWINGS

In the drawings:

FIG. 27 is a front view illustrating another embodiment of the insulating member;

DESCRIPTION OF PREFERRED EMBODIMENTS

Figure 1:
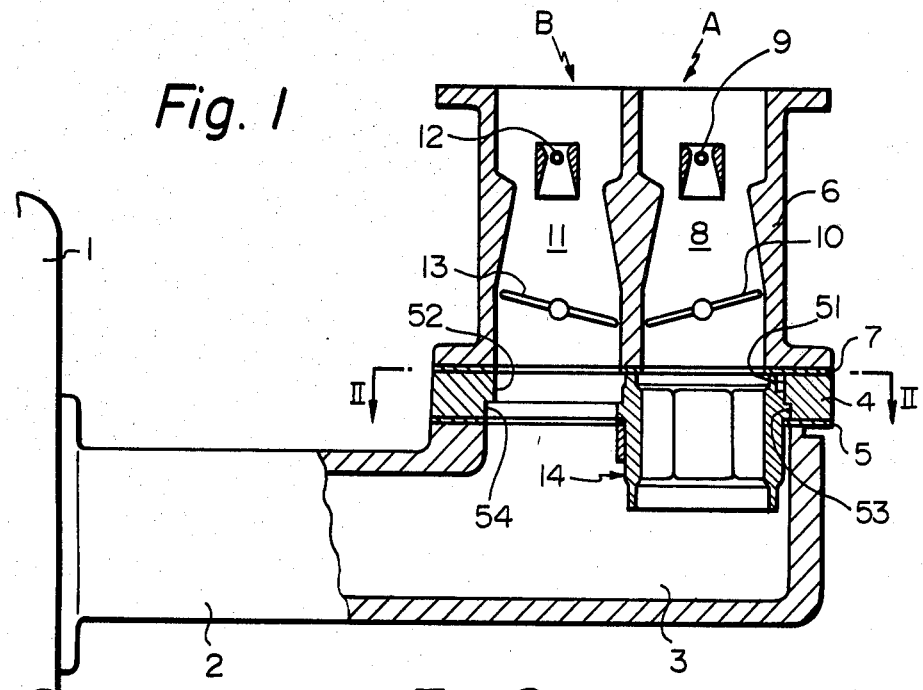
FIG. 1 is a sectional side view of the intake system of an engine according to the present device.
Figure 2:
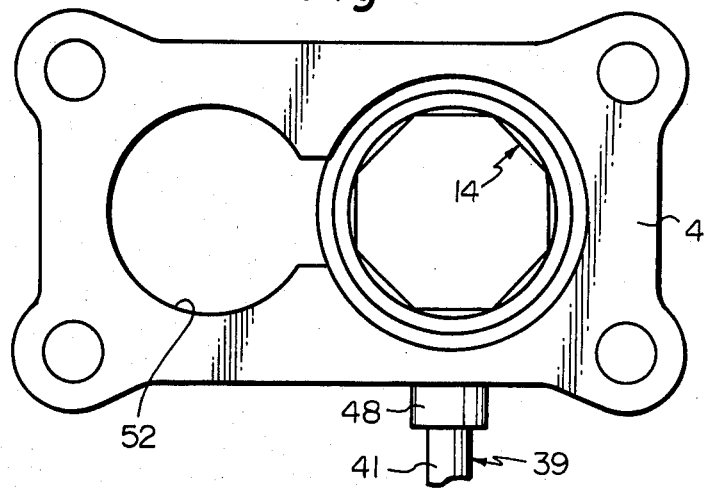
FIG. 2 is a plan view taken along the line II—II in FIG. 1.
Figure 6:
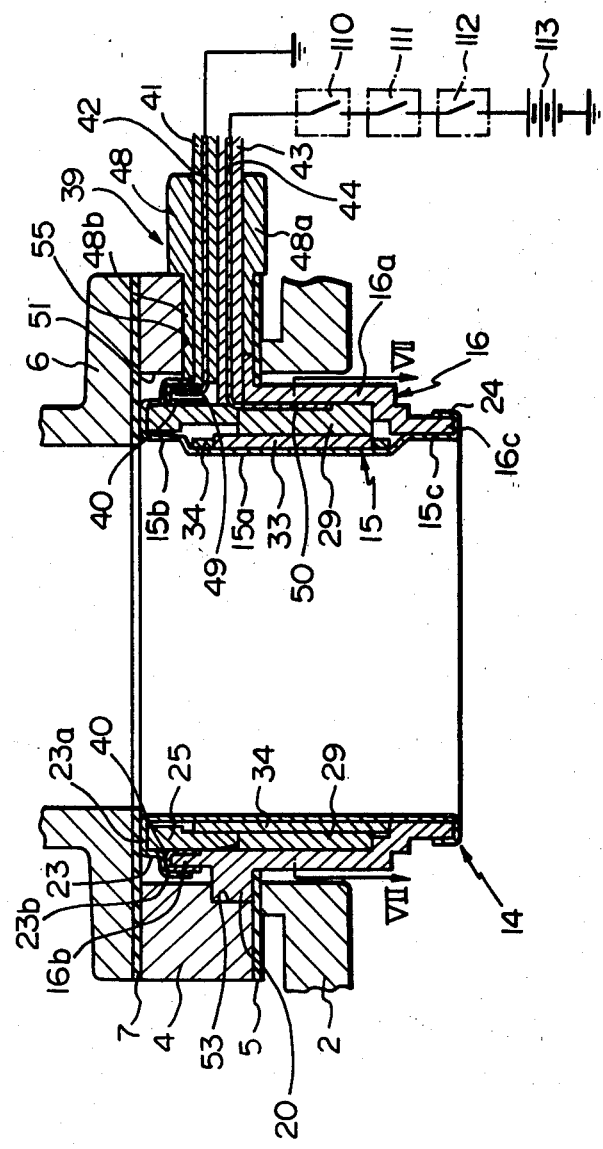
FIG. 6 is a cross-sectional side view of the heating element vessel taken along the line VI—VI in FIG. 7.
Figure 7:
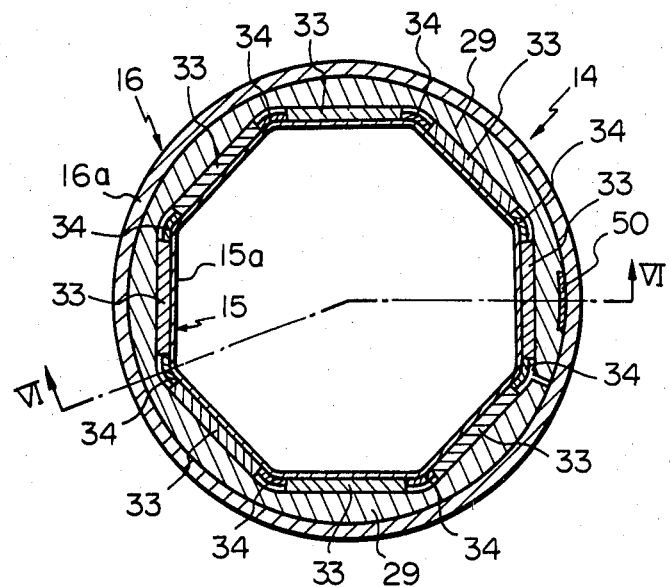
FIG. 7 is a cross-sectional plan view taken along the line VII—VII in FIG. 6.
Figure 8:
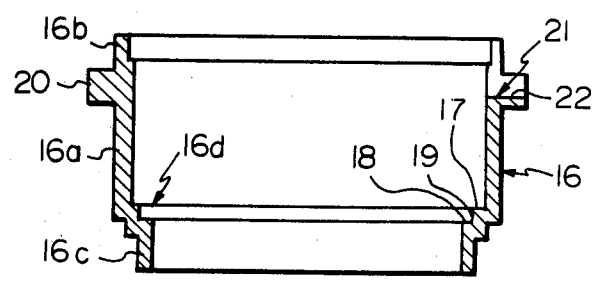
FIG. 8 is a cross-sectional side view of the outer pipe.
Figure 9:
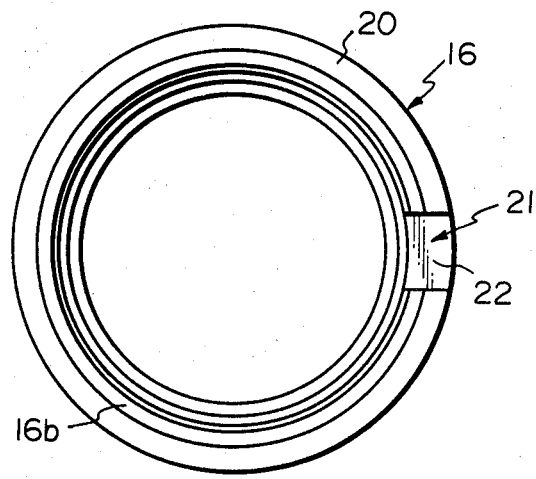
FIG. 9 is a plan view of the outer pipe.
Figure 10:
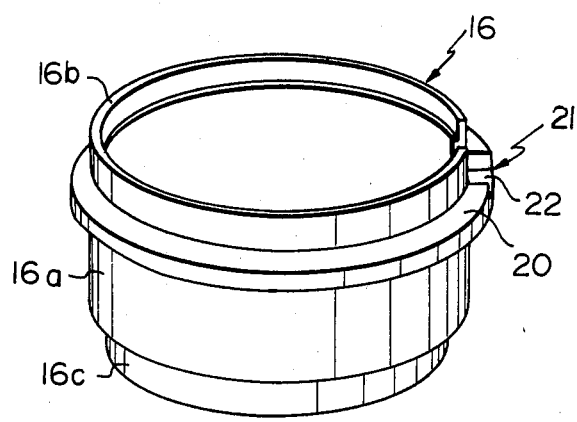
FIG. 10 is a perspective view of the outer pipe.

In FIG. 1, reference numerals 1, 2, 3, 4, and 6 designate an engine body, an intake manifold, a collecting portion of the intake manifold 2, a heat-insulating plate of a plastic material attached onto the collecting portion 3 via a gasket 5, and a carbureter secured to the heat-insulating plate 4 via a gasket 7, respectively. This carbureter 6 has a primary carbureter A and a secondary carbureter B. The primary carbureter A is provided with a primary air horn 8, a primary main nozzle 9, and a primary throttle valve 10, and the secondary carbureter B is provided with a secondary air horn 11, a secondary main nozzle 12, and a secondary throttle valve 13. As shown in FIG. 1, a hollow heating element vessel 14 is arranged in the heat insulating plate 4 in the lower end portion of the primary carburetor A in alignment with the primary air horn 8 and is projected into the collecting portion 3. As shown in FIGS. 6 and 7, this hollow heating element vessel 14 comprises an inner pipe 15 composed of a thin metallic material and an outer pipe 16 composed of a thin plastic material. As is illustrated in FIGS. 6 through 10, the outer pipe 16 has an intermediate portion 16a having a uniform inner diameter, a top end portion 16b having an inner diameter slightly larger than the inner diameter of the intermediate portion 16a, and a lower end portion 16c having an inner diameter smaller than the inner diameter of the intermediate portion 16a. The thickness of the top end portion 16b is slightly less than that of the intermediate portion 16a, and the thickness of the lower end portion 16c is substantially equal to the thickness of the intermediate portion 16a. An inwardly descending step portion 16d is formed between the intermediate portion 16a and the lower end portion 16c, and this step portion 16d comprises a first annular shoulder 17 extending in the radial direction, a second annular shoulder 18 extending in the radial direction and located below the first annular shoulder 17, and a cylindrical wall 19 extending in the axial direction and located between the first annular shoulder 17 and the second annular shoulder 18. An annular flange 20 having a rectangular section is integrally formed on the back surface of the intermediate portion 16a at a position adjacent to the top end portion 16b. Furthermore, a cut-away portion 21 extending from the top end portion 16b into the flange 20 is formed on the outer pipe 16, and a flat face extending in the radial direction is formed on the bottom 22 of the cut-away portion 21. As described hereinbefore, this outer pipe 16 is integrally molded from a plastic material 16, but the outer pipe 16 may also be formed from a metallic material.

As shown in FIGS. 6, 7, 11, 12, and 13, the inner pipe 15 has an intermediate portion 15a having an octahedral section, a cylindrical top end portion 15b, and a cylindrical lower end portion 15c. The inner diameter of the cylindrical top end portion 15b is the same as the inner diameter of the cylindrical lower end portion 15c, and the intermediate portion 15a as a whole expands inwardly from the cylindrical upper end portion 15b and cylindrical lower end portion 15c. A step-like flange 23 extending outwardly is integrally formed on the top end of the cylindrical top end portion 15b. This step-like flange 23 comprises an inner flange 23a having an L-shaped section and extending outwardly beyond the top end of the cylindrical upper end portion 15b and an outer flange 23b having an L-shaped section and extending outwardly beyond the tip of the inner flange 23a. Furthermore, a flange 24 having an L-shaped section and extending outwardly is integrally formed on the top end of the cylindrical lower end portion 15c, and as shown in FIG. 6, this flange 24 is fitted onto the lower end portion 16c of the outer pipe 16.

Figure 14:
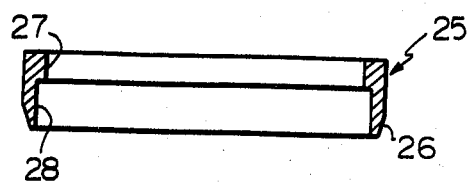
FIG. 14 is a cross-sectional side view of the insulating ring.
Figure 15:
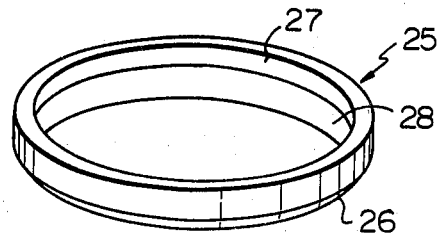
FIG. 15 is a perspective view of the insulating ring.

As shown in FIG. 6, an insulating ring 25 composed of a heat-resistant fluorine resin such as polytetrafluoroethylene or a heat-resistant rubber such as a silicone rubber, is inserted between the inner pipe 15 and the outer pipe 16, and is fitted in the inner flange 23a of the inner pipe 15. As shown in FIGS. 6, 14, and 15, the insulating ring 25 has a hollow cylindrical shape as a whole, and the lower end portion 26 of the peripheral wall of the insulating ring 25 is tapered. The inner circumferential face of the insulating ring 25 is divided into an upper-half small-diameter portion 27 and a lower-half large-diameter portion 28 having an inner diameter slightly larger than that of the small-diameter portion 27. As shown in FIG. 6, when the insulating ring 25 is fitted in the inner flange 23a, an annular gap is formed between the large-diameter portion 28 of the insulating ring 25 and the inner pipe 15.

Figure 16:
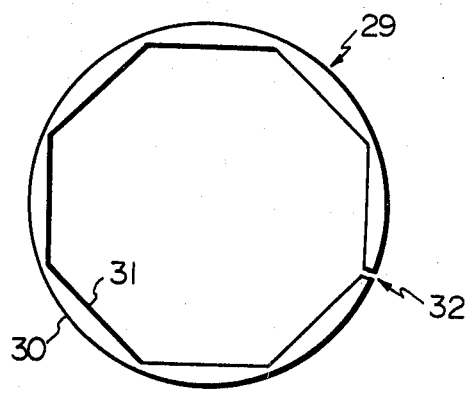
FIG. 16 is a plan view of the elastic electrode.
Figure 17:
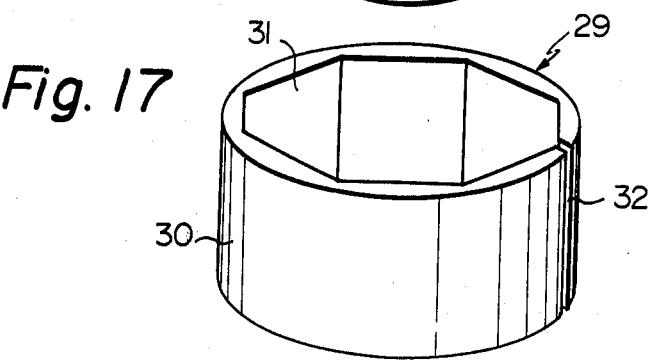
FIG. 17 is a perspective view of the elastic electrode.

As shown in FIGS. 6 and 7, an annular elastic electrode 29 composed of graphite is inserted between the inner pipe 15 and the outer pipe 16. As shown in FIGS. 16 and 17, this elastic electrode 29 has a cylindrical peripheral face 30 and an inner circumferential face 31 having an octahedral section, and is separated by a slit 32 extending in the axial direction. As is seen from FIG. 7, the elastic electrode 29 is inserted between the inner and outer pipes 15 and 16 so that respective flat faces constituting the octahedron of the inner circumferential face 31 of the elastic electrode 29 confront the corresponding flat faces constituting the octahedron of the inner pipe 15. Furthermore, as is seen from FIG. 6, the length of this elastic electrode 29 is shorter than the length of the intermediate portion 15a of the inner pipe 15, and the elastic electrode 29 is arranged in the region of this intermediate portion 15a of the inner pipe 15.

Figure 18:
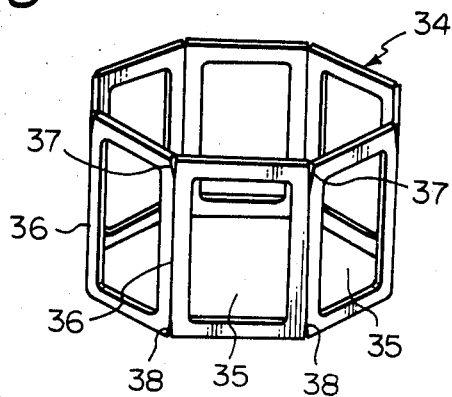
FIG. 18 is a perspective view of the insulating member at the time of insertion.
Figure 19:
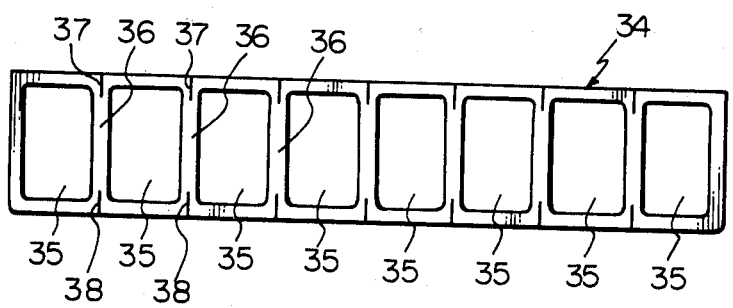
FIG. 19 is a plan view of the insulating member.
Figure 20:
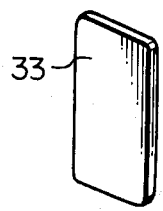
FIG. 20 is a perspective view of the PTC element.

A PTC element 33 is inserted into each of gaps between the flat faces of the peripheral face of the intermediate portion 15a of the inner pipe 15 and the elastic electrode 29, and furthermore, an insulating member 34 having a thickness smaller than that of each PTC element 33 is inserted to surround the peripheral walls of said PTC elements 33. As shown in FIG. 19, the insulating member 34 is composed of belt-like asbestos and eight holes 35 are equidistantly formed on the insulating member 34. As shown in FIG. 20, each PTC element has a rectangular plate-like shape, and as shown in FIG. 19, the holes 35 of the insulating member 34 have a contour substantially the same as that of the PTC elements 33. As is seen from FIG. 19, the holes 35 are separated from one another by ribs 36 arranged equidistantly, and notches 37 and 38 are formed on both the outer end portions of each rib 36. When the insulating member 34 is inserted between the inner and outer pipes 15 and 16, as shown in FIG. 18, the insulating member 34 comes to have an octahedral shape. In order that the insulating member 34 is easily deformed into an octahedral shape at the time of insertion, the above-mentioned notches 37 and 38 are formed on both the outer end portions of each rib 36. Incidentally, the respective flat faces constituting the octahedron of the insulating member 34 are arranged on the corresponding flat faces constituting the octahedron of the inner pipe 15, and the PTC elements 33 are inserted into the corresponding holes 35 of the insulating member 34.

Figure 21:
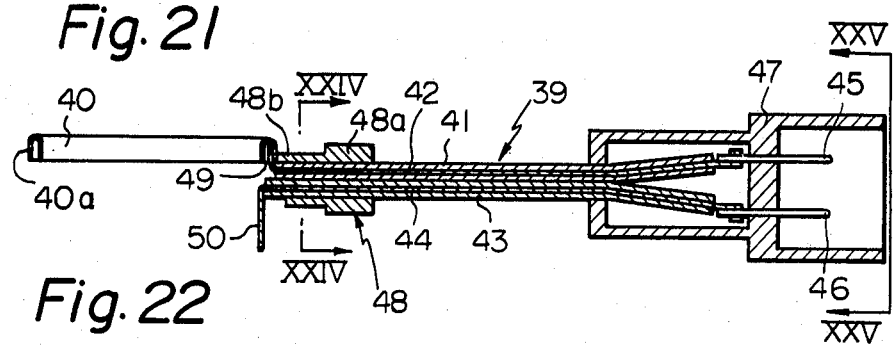
FIG. 21 is a cross-sectional side view of the electrode unit.
Figure 22:
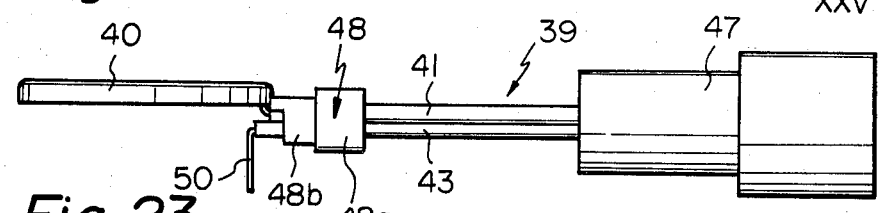
FIG. 22 is a side view of the electrode unit.
Figure 23:
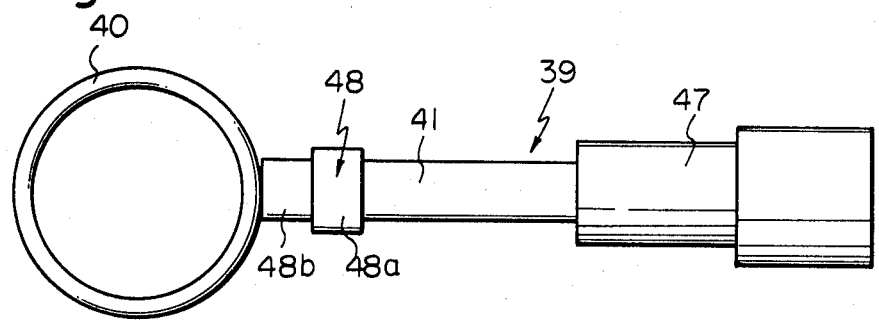
FIG. 23 is a plan view of the electrode unit.
Figure 24:
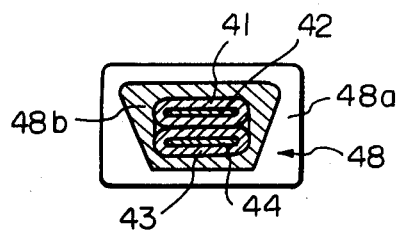
FIG. 24 is a view showing the section taken along the line XXIV—XXIV in FIG. 21.
Figure 25:
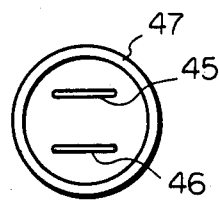
FIG. 25 is a side view taken along the line XXV—XXV in FIG. 21.

As shown in FIG. 6, an electrode unit 39 extending outwardly in the radial direction is attached to the upper end portion of the hollow heating element vessel 14. This electrode unit 39 comprises, as shown in FIGS. 21 through 25, a metal ring 40 having a U-shaped section, a band-like negative-side lead 42 covered with an insulating tube 41, a band-like positive-side lead 44 covered with an insulating tube 43, and a connector 47 provided with a pair of terminals 45 and 46. The insulating tubes 41 and 43 are overlapped and a retainer 48 formed of a rubber material is inserted on the peripheries of the overlapped tubes 41 and 43. This retainer 48 comprises an outer side portion having a rectangular section and an inner-side portion 48b having a trapezoidal section. As shown in FIG. 21, the inner end 49 of the negative side lead 42 is upwardly bent at a right angle, and the bent inner end 49 is welded in the U-shaped section of the ring 40. The outer end of the negative side lead 42 is connected to the terminal 45 of the connector 47. The inner end 50 of the positive side lead 44 is downwardly bent in the direction opposite to the bending direction of the bent inner end portion 49 of the negative side lead 42, and the outer end of the positive side lead 44 is connected to the terminal 46 of the connector 47. As shown in FIG. 6, the U-shaped section of the ring 40 is fitted in the top end portion 16b of the outer pipe 16, and the outer flange 23b of the inner pipe 15 is fitted onto the ring 40. The bent inner end 50 of the positive side lead 44 is inserted between the intermediate portion 16a of the outer pipe 16 and the elastic electrode 29. Incidentally, plain stitch copper may be used for formation of the positive and negative side leads 44 and 42 instead of the above-mentioned band-like metal plates.

Figure 3:
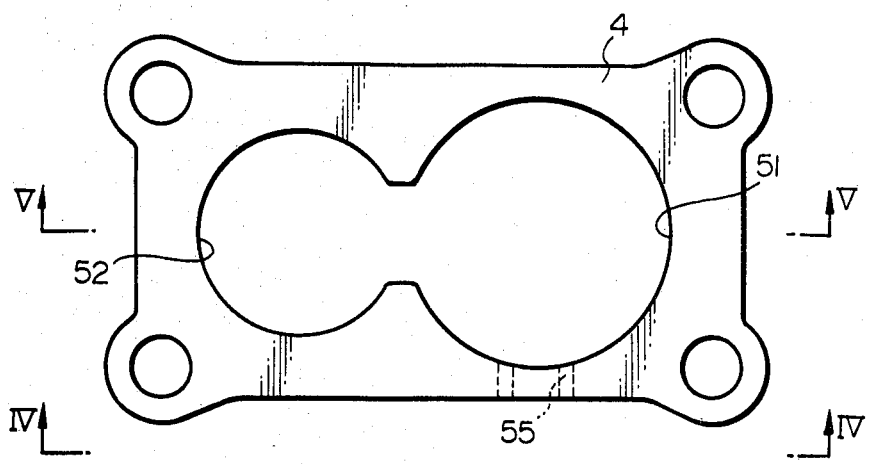
FIG. 3 is a plan view of the heat insulating plate shown in FIG. 1.
Figure 4:
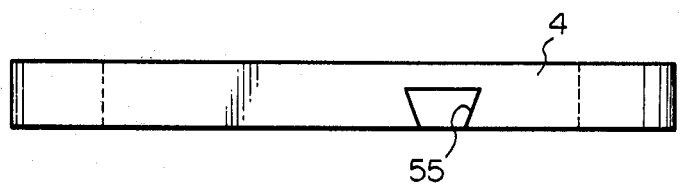
FIG. 4 is a side view taken along the line IV—IV in FIG. 3.
Figure 5:
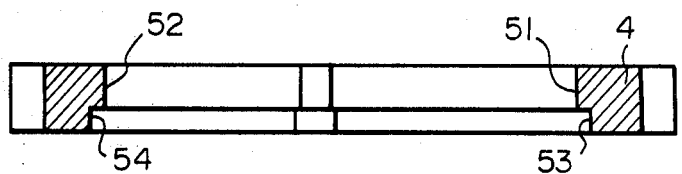
FIG. 5 is a cross-sectional view taken along the line V—V in FIG. 3.

As is shown in FIGS. 1 through 5, a large-diameter hole 51 and a small-diameter hole 52, which are connected to each other, are formed on the heat insulating plate 4, and the hollow heating element vessel 14 is placed in the large-diameter hole 51. The small-diameter hole 52 is arranged in alignment with the secondary air horn 11. As shown in FIGS. 1, 5, and 6, grooves 53 and 54 having an L-shaped section are formed along the entire length of the lower side portion of the inner circumferential wall face of the heat insulating plate 4 defining the large-diameter hole 51 and small-diameter hole 42, and the flange 20 integrally formed on the peripheral wall face of the outer pipe 16 is fitted in the groove 53 of the large-diameter 51. Further, as shown in FIGS. 3, 4, and 6, a dovetail groove 55 is formed on the lower side wall face of the heat insulating plate 4, and the inner side portion 48b of the retainer 48, having a trapezoidal section, is fitted in this dovetail groove 55.

The method for manufacturing the heating element vessel 14 will now be described with reference to FIG. 26.

Figure 26A:
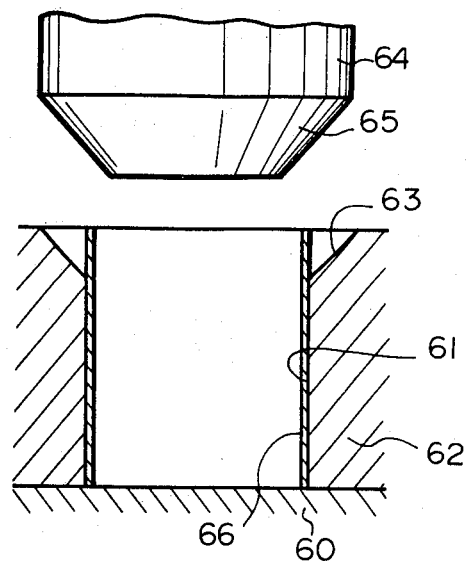
FIG. 26 is a diagram illustrating the steps of manufacturing the heating element vessel.
Figure 26B:
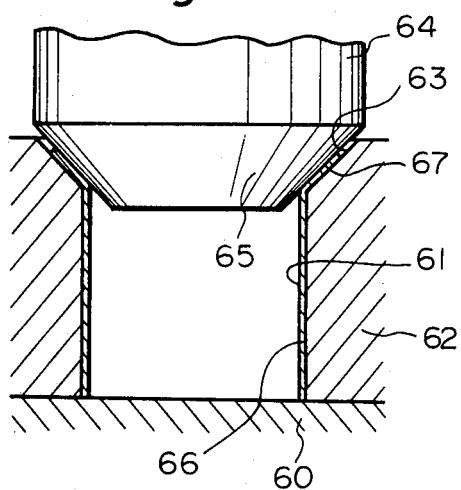
Figure 26C:
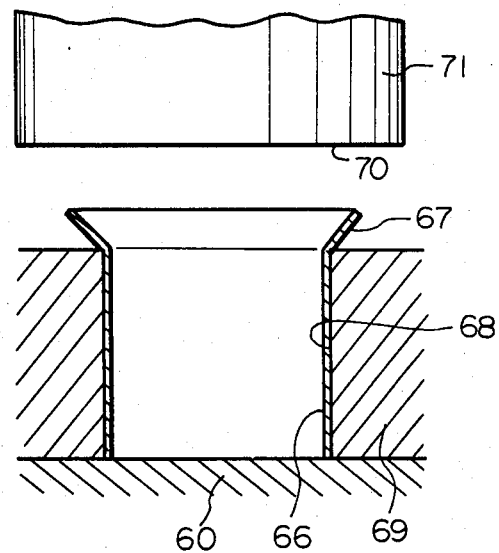
Figure 26D:
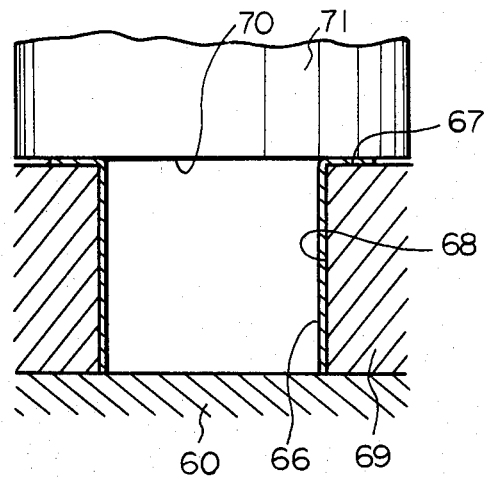
Figure 26E:
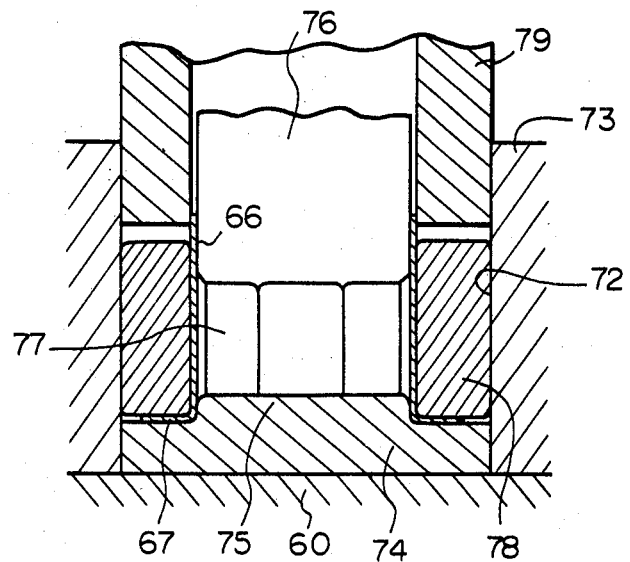
Figure 26F:
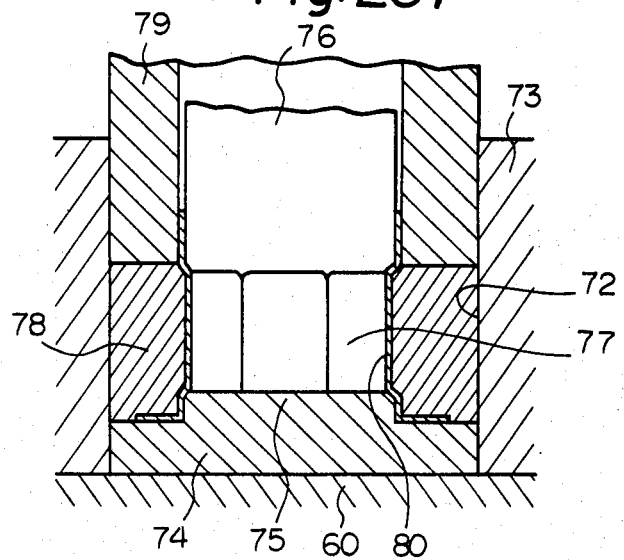
Figure 26G:
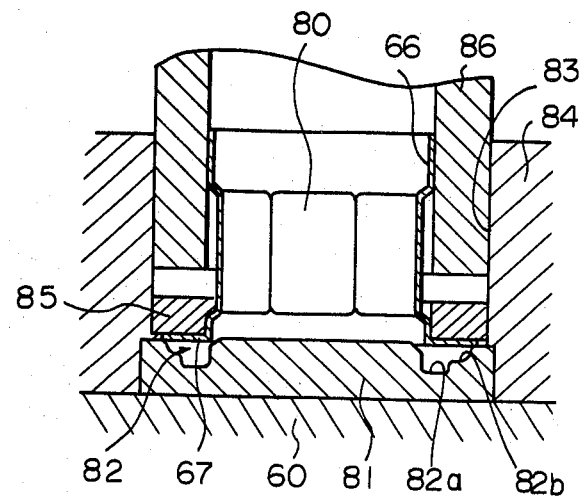
Figure 26H:
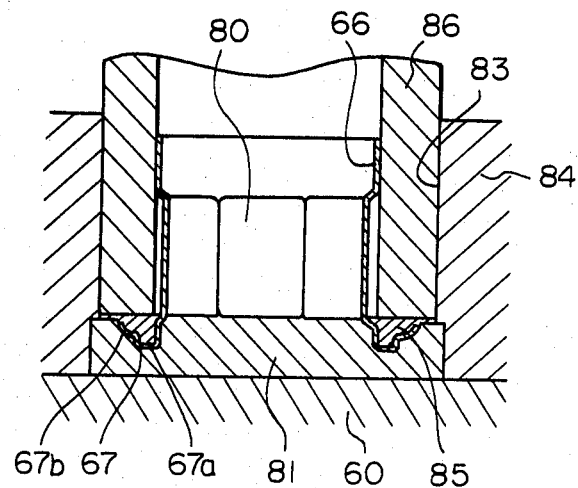
Figure 26M:
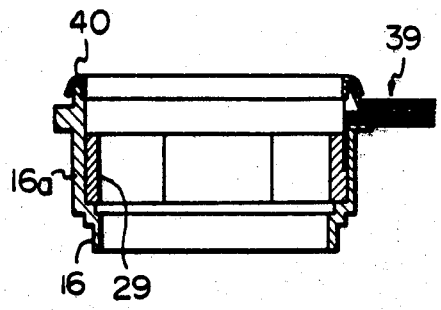
Figure 26N:
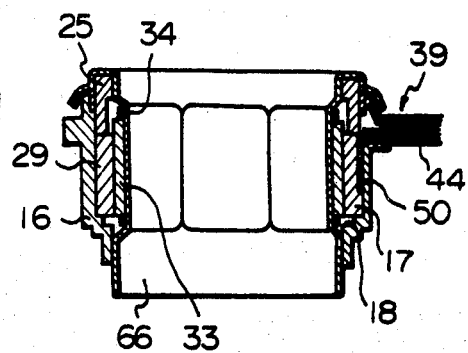
Figure 26O:
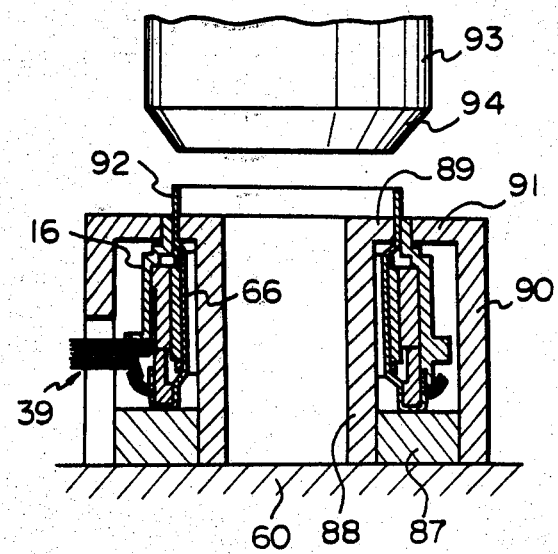
Figure 26:
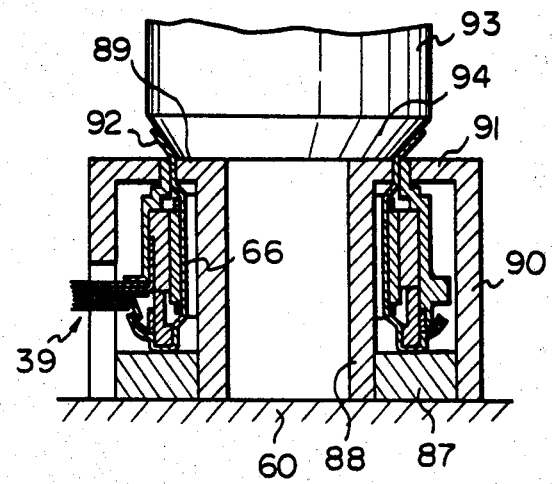
Figure 26:
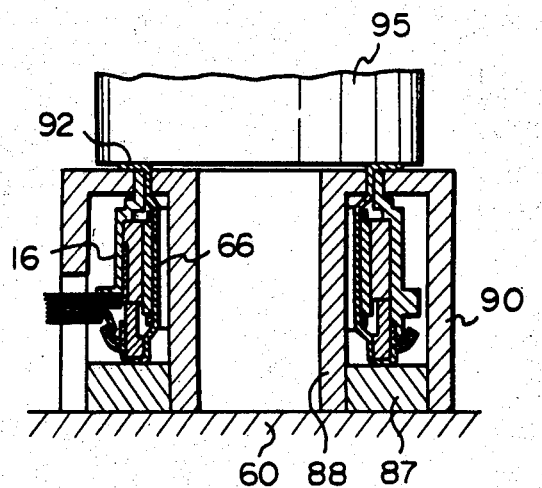
Figure 26R:
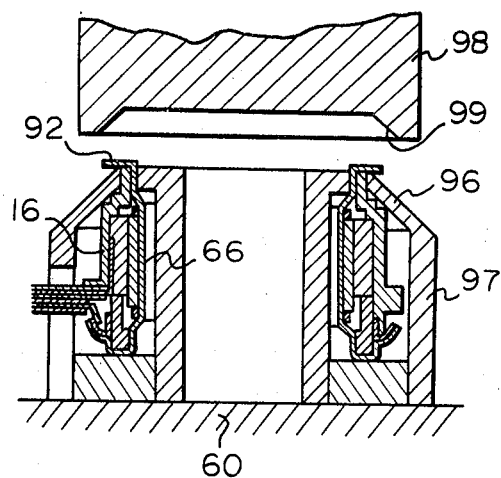
Figure 26S:
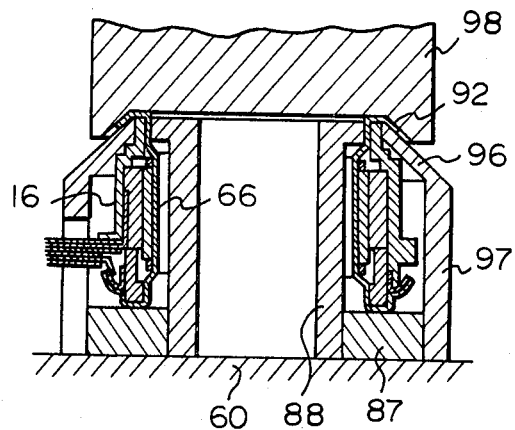

At first, as shown in FIG. 26-(a), a die 62 having a cylindrical through-hole 61 is placed on a base stand 60. This die 62 has an upwardly expanded conical face 63 in the top end portion of the through-hole 61. A punch 64 has a conical face 65 on the lower end portion thereof. A hollow thin pipe 66 is inserted in the cylindrical through-hole 61 of the die 62. As shown in FIG. 26-(b), the punch 64 is brought down onto the die 62. Thus, the top end portion 67 of the pipe 66 is formed in a conical shape. As shown in FIG. 26-(c), a die 69 having a cylindrical through-hole 68 is placed on the base stand 60 and the pipe 66 is inserted in the cylindrical through-hole 68 of the die 69 so that the conical portion 67 is projected from the top face of the die 69. As shown in FIG. 26-(d), a punch 71 having a flat lower end face 70 is brought down onto the die 69, whereby an annular portion 67 projecting outwardly in the radial direction is formed. As shown in FIG. 26-(e), a die 73 having a cylindrical through-hole 72 is placed on the base stand 60, and a disc-like die 74 is inserted in this cylindrical through-hole 72. A raised portion 75 having an outer diameter substantially equal to the inner diameter of the pipe 66 is integrally formed on the top face of the die 74, and the pipe 66 is inserted within the raised portion 75 so that the annular portion 67 is located below. A die 76 is inserted into the pipe 66. The die 76 has on the lower end portion thereof a portion 77 having an octahedral section. An annular member 78 formed of a urethane resin is inserted between the pipe 66 and the cylindrical through-hole 72 of the die 73, and a hollow cylindrical punch 79 is inserted between the pipe 66 and the cylindrical through-hole 72 of the die 73. As shown in FIG. 26-(f), the punch 79 is brought down, whereby the urethane resin annular member 78 is compressed and brought into pressing contact with the portion 77 having an octahedral section, with the result that a portion 80 having an octahedral section, which forms the intermediate portion 15a of the inner pipe 15, is formed.

As shown in FIG. 26-(g), a disc-like die 81 is placed and the pipe 66 is mounted on this die 81. An annular groove 82 is formed on the surface of the die 81, and the sectional shape of the annular groove 82 has a U-shaped section portion 82a located on the inner side and a curved section portion 82b located outside the U-shaped section portion 82a. A die 84 having a cylindrical through-hole 83 is fitted on the peripheral face of the die 81, and an annular member 85 of a urethane resin is inserted on the annular portion 67 of the pipe 66. A hollow cylindrical punch 86 is inserted between the cylindrical throughole 83 and the pipe 66. As shown in FIG. 26-(h), the punch 86 is brought down to compress the urethane resin annular member 85, whereby the annular portion 67 of the pipe 66 is pushed into the annular groove 82 of the die 81 and a flange portion 67 forming the flange 23 of the inner pipe 15 is formed. Incidentally, an inner flange 67a of the flange portion has the same shape as that of the inner flange 23a of the inner pipe 15 shown in FIG. 11, but an outer flange 67b of the flange portion 67 is expanded more outwardly than the outer flange 23b of the inner pipe 15 shown in FIG. 11.

As shown in FIG. 26-(i), an insulating ring 25 as shown in FIG. 14 is inserted on the periphery of the pipe 66, and the insulating ring 25 is fitted within the inner flange portion 67a. Then, an insulating member 34 as shown in FIG. 19 is formed into a ring as shown in FIG. 18, and the top end portion of the insulating member 34 is inserted between the large-diameter portion 28 of the insulating ring 25 and the pipe 66 as shown in FIG. 26-(j). At this time, the insulating member 34 is held by the insulating ring 25. Then, as shown in FIG. 26-(k), PTC elements 33 are fitted in the holes 35 of the insulating member 34, respectively. At this time, each PTC element 33 is held by the frictional engagement with the peripheral edge of the hole 35 and the insulating ring 25. Accordingly, when the insulating member 34 and PTC elements 33 are arranged as shown in FIG. 26-(k), they are prevented from dislodging from the pipe 66.

The outer pipe 16 is integrally molded from a plastic material, as shown in FIG. 26-(l), the ring 40 of the electrode unit 39 is fitted in the top end portion 16a of the outer pipe 16, and the insulating tubes 41 and 43 of the electrode unit 39 are fitted within the cut-away portion 21 of the outer pipe 16. At this time, the retainer 48 shown in FIG. 21 is shifted to the right in FIG. 21. Furthermore, as shown in FIG. 26-(l), the outer portion 40a of the ring 40 is expanded more outwardly than the outer portion 40a of the ring 40 shown in FIG. 21. As shown in FIG. 26-(l), when the ring 40 is fitted on the top end portion 16b of the outer pipe 16, the ring 40 is brought into frictional engagement with the top end portion 16b of the outer pipe 16 to hold the ring 40 on the outer pipe 16. As shown in FIG. 26-(m), the elastic electrode 29 shown in FIG. 16 is inserted in the intermediate portion 16a of the outer pipe 16. As shwon in FIG. 26-(n), the pipe 66 is pressed into the outer pipe 16 by using a pressing device (not shown) or the like. When the pipe 66 is thus pressed into the outer pipe 16, the PTC elements 33 are strongly pressed to the peripheral face of the pipe 66 by the elastic force of the elastic electrode 29, and also the bent inner end portion 50 of the positive lead line 44 is strongly pressed to the elastic electrode 29. When the pipe 66 is pressed into the outer pipe 16, the top end portion of the elastic electrode 29 is brought into abutting contact with the lower end portion of the insulating ring 25 and the lower end portion of the elastic electrode 29 is brought into abutting contact with the first annular shoulder 17 of the outer pipe 16. Accordingly, the elastic electrode 29 is secured and held between the insulating ring 25 and the first annular shoulder 17. When the pipe 66 is pressed into the outer pipe 16, the lower edge of the bent portion of the insulating member 34 is brought into abutting contact with the second annular shoulder 18, whereby the insulating member 34 is located at a predetermined position.

Figure 11:
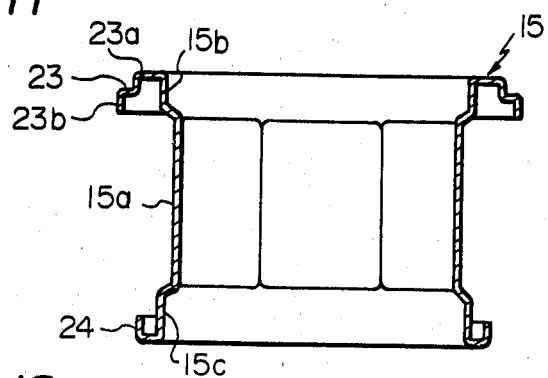
FIG. 11 is a cross-sectional side view of the inner pipe.
Figure 12:
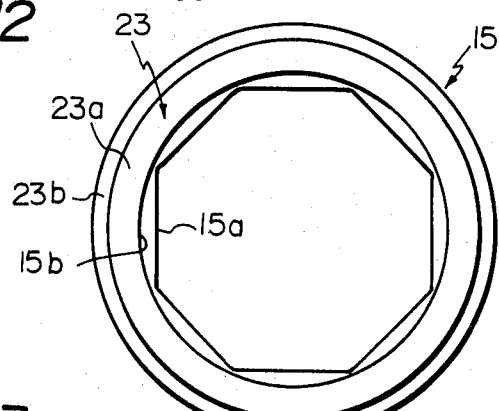
FIG. 12 is a plan view of the inner pipe.
Figure 13:
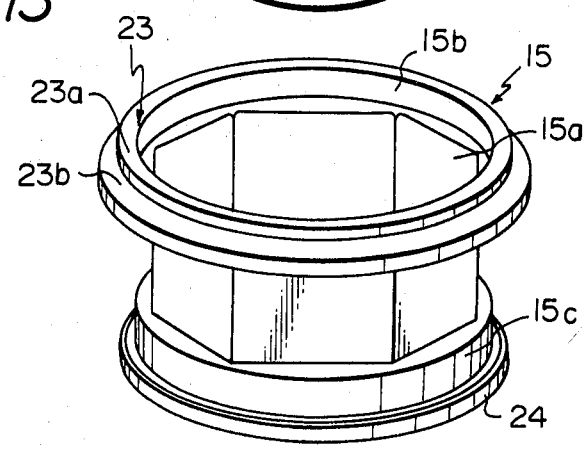
FIG. 13 is a perspective view of the inner pipe.

As shown in FIG. 26-(o), a ring-like spacer 87 is placed on the base stand 60 and the assembly of the outer pipe 16 and the pipe 66 is placed on the spacer 87 so that the electrode unit 39 is located below. A hollow cylindrical holder 88 is fitted in the inner pipe 66. This holder 88 has on the top end portion thereof an annular projection 89 which projects outwardly. The annular projection 89 is brought into abutting contact with the pipe 66 to hold the pipe 66. A split mold type die 90 is fitted on the peripheral wall face of the spacer 87. The die 90 has an annular projection 91 which projects inwardly at the same height as that of the annular projection 89 of the holder 88. The pipe 66 and outer pipe 16 are held between the annular projection 89 of the holder 88 and the annular projection 91 of the die 90. Incidentally, as shown in FIG. 26-(o), the top end portion 92 of the pipe 66 projects upward beyond the holder 88 and the top of the die 90. A conical face 94 is formed on the lower end portion of a punch 93. As shown in FIG. 26-(p), this punch 93 is brought down to expand the top end portion 92 of the pipe 66 in the conical form. As shown in FIG. 26-(q), the top end portion 92 of the pipe 66 is pressed by a punch 95 having a flat bottom face, whereby a flange portion 92 extending outwardly in the radial direction is formed. Then, as shown in FIG. 26-(r), the pipe 66 and outer pipe 16 are held by using a split mold type die 97 having a conical projection 96 instead of the die 90. A punch 98 has a conical face 99. The punch 98 is brought down, whereby the peripheral portion of the flange 92 of the pipe 66 is bent downwardly as shown in FIG. 26-(s). As shown in FIG. 26-(t), the assembly of the pipe 66 and the outer pipe 16 is attached to a bending device. This bending device comprises holders 102 and 103 supported by rotation shafts 100 and 101, respectively, and a pair of discs 105 and 106 supported by a rotation shaft 104. The assembly of the pipe 66 and the outer pipe 16 is first fitted on the holder 102 and a spacer 107 is fitted on the top end portion of the holder 102. Then, the holder 103 is moved in the direction of arrow A to press an annular projecting top end 108 of the holder 103 against the flange 92 of the pipe 66, whereby the assembly of the pipe 66 and the outer pipe 16 is supported by the holders 102 and 103 as shown in FIG. 26-(t). The disc 105 is arranged so that the peripheral edge portion of the disc 105 confronts the flange 92 of the pipe 66, and the disc 106 is arranged so that the peripheral edge portion of the disc 106 confronts the outer flange 67b of the pipe 66. As shown in FIG. 26-(t), when the assembly of the pipe 66 and the outer pipe 16 is attached to the holders 102 and 103, the rotation shafts 100, 101, and 104 are rotated around the axial lines thereof, and the rotation shaft 104 is moved in the direction of arrow B while being rotated, with the result that the peripheral face of the disc 105 is brought into contact with the flange 92 of the pipe 66 and the flange 92 is pressed against the peripheral face of the outer pipe 16. The peripheral face of the disc 106 is brought into contact with the outer flange 67b of the pipe 66, and the flange 67b and the outer portion 40a of the ring 40 are pressed against the peripheral face of the outer pipe 16. Thus, the flange 92 and outer flange 67b of the pipe 66 are bent and connected with the outer pipe 16, and the inner pipe 15 shown in FIGS. 6 and 11 is formed. The insulating tubes 41 and 43 of the electrode unit 39 are inserted into the dovetail groove 55 of the heat insulating plate 4, and, simultaneously, the flange 20 of the outer pipe 16 is pressed into the groove 53 formed on the large-diameter hole 51 of the heat insulating plate 4, whereby the heating element vessel 14 is secured to the heat insulating plate 4. The inner side portion 48b, having a trapezoidal section, of the retainer 48 inserted onto the insulating tubes 41 and 43 is fitted in the dovetail groove 55. As shown in FIG. 6, the heat insulating plate 4 is secured onto the intake manifold 2 via the gasket 5, and the carbureter 6 is fastened onto the heat insulating plate 4 via the gasket 7.

As shown in FIG. 6, the negative side lead 42 is earthed, and the positive side lead 44 is connected to a power source 113 through a temperature detecting switch 110, a neutral point voltage detecting switch 111, and an ignition switch 112. The temperature detecting switch 110 is turned on when the temperature of the engine cooling water is lower than, for example, 60° C., and is turned off when the temperature of engine cooling water exceeds 60° C. The neutral point voltage detecting switch 111 is turned off when the neutral point voltage of the engine-driven alternator is lower than a predetermined level, and is turned on when this neutral point voltage exceeds the predetermined level.

Since a large current flows at the time of starting the supply of the electric current, it is necessary that the supply of the electric current to the PTC element 33 not be started while the starter motor is actuated to start the engine. A neutral point voltage detecting switch 111 is equipped for this purpose. More specifically, while the engine is rotated by the starter motor, the neutral point voltage is low, and when the engine is rotated by its own power, the neutral point voltage is increased, the neutral point voltage detecting switch is turned on, and the supply of the electric current to the PTC element 33 is started. When the supply of the electric current to the PTC element 33 is thus started, the temperature of the PTC element is immediately elevated and, therefore, the temperature of the inner pipe 15 is immediately elevated.

When the engine is started, the majority of the liquid fuel supplied from the primary carbureter A flows down along the inner wall face of the primary air horn 8. This liquid fuel flows down along the inner wall face of the inner pipe 15. The outer pipe 16 is formed of a heat insulating material and is supported by the heat insulating plate 4. Accordingly, only a very small proportion of heat generated by the PTC element 33 escapes to the intake manifold 2 and the carburetor 6. The majority of heat generated by the PTC element 33 is used for heating the inner pipe 15. Since the inner wall face of the inner pipe 15 is covered with the liquid fuel, the majority of heat generated by the PTC element 33 is used for vaporizing the liquid fuel. Furthermore, since the intermediate portion 15a of the inner pipe 15 expands inwardly from the top end portion 15b of the inner pipe 15, adhesion of fuel drops floating in the air-fuel mixture to the intermediate portion 15a of the inner pipe 15 is accelerated, and vaporization of the fuel is further promoted.

When a certain time has passed from the point of starting the engine and the temperature of engine cooling water exceeds 60° C., the temperature detecting switch 110 is turned off to stop the supply of the electric current to the PTC element 33.

Figure 28:
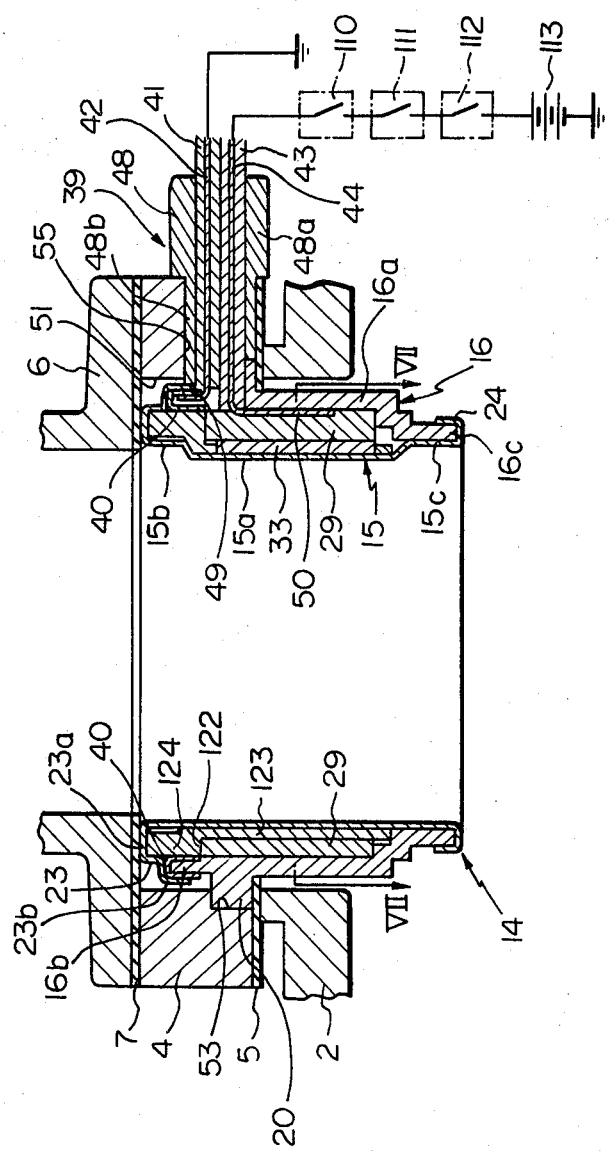
FIG. 28 is a cross-sectional side view illustrating still another embodiment of the insulating member.
Figure 29:
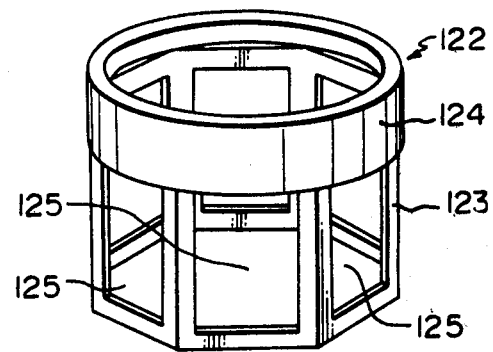
FIG. 29 is a perspective view of the insulating member shown in FIG. 28.

As shown in FIG. 19, the insulating member 34 is formed in a belt-like shape so that all the PTC elements 33 can simultaneously be held on one insulating member 34. Alternately, a plurality of insulating members, each having an opening 121 for holding one PTC element 33 as shown in FIG. 27, may be used. In the embodiment illustrated in FIGS. 28 and 29, an insulating member 122 comprises a portion 123 having an octahedral section and an annular head 124, which are integrally formed of, for example, silicone rubber. Eight openings 125 having substantially the same contour as that of the PTC element 33 are formed on the octahedral portion 123, and one PTC element 33 is fitted in each of these openings 125. As shown in FIG. 28, the annular head 124 is fitted in the inner flange 23a of the inner pipe 15. Accordingly, in this embodiment, this annular head 124 performs the function of the insulating ring 25 shown in FIGS. 14 and 15. Therefore, this embodiment is advantageous in that the insulating head 25 need not be equipped.

Since the intermediate portion 15a of the inner pipe 15 has a polygonal section, for example, an octahedral section, PTC elements 33 having a plate-like shape can be used, and hence, manufacture of PTC elements can be simplified. The top end portion 15b and lower end portion 15c of the inner pipe 15 are formed to have a cylindrical shape so that the flanges 23 and 24 can be formed with ease. As pointed out hereinbefore, the elastic electrode 29 is formed of graphite. Graphite has an elastic property due to the cushioning action of air present among graphite crystal layers, and the respective PTC elements 33 are pressed onto the inner pipe 15 by this elastic property. Furthermore, as explained hereinbefore with reference to FIG. 26-(n), the pipe 66 is pressed into the outer pipe 16. Since graphite has a slip lubricating action, at this pressing operation, the elastic electrode 29 can be inserted around the PTC elements 33 without damage to the PTC elements 33. Moreover, graphite has a directional property in heat conductivity, and the heat conductivity in the radial direction is lower than the heat conductivity in the circumferential direction. Accordingly, heat is not smoothly conducted in the radial direction in graphite, and hence, the elastic electrode 29 exerts a heat insulating action. Furthermore, as pointed out hereinbefore, the outer pipe 16 is formed of a heat insulating material, and the elastic electrode 29 has a heat insulating action. Therefore, the majority of heat generated by PTC elements can be used for heating the inner pipe 15. Still further, since heat is smoothly conducted in the circumferential direction in graphite, the inner pipe 15 can be heated uniformly.

As will be apparent from the foregoing description, according to the present device, one need only insert the top end portion of the insulating member in the gap between the insulating ring and the inner pipe to attach the insulating member to the inner pipe, therefore, facilitating attachment of the insulating member remarkably. Moreover, since PTC elements are fitted in openings of the insulating member, the PTC elements can be securely held by the insulating member. Accordingly, even if the heating element vessel vibrates by engine oscillation, the PTC elements in the heating element vessel are prevented from vibrating, and thereby effectively preventing cracking of the PTC elements. Furthermore, since the insulating member is formed of an elastic material such as asbestos or silicone rubber, as pointed out hereinbefore, even if there is some size irregularity among the PTC elements, they can easily be fitted in the openings of the insulating member.

While the invention has been described by reference to specific embodiments chosen for purposes of illustration, it should be apparent that numerous modifications could be made thereto by those skilled in the art without departing from the basic concept and scope of the invention.

We claim:

1. A hollow heater vessel of an internal combustion engine, which is placed in an intake passage between fuel supply means and a cylinder of the engine, said hollow heater vessel comprising:
   an inner pipe having therein a mixture passage which is aligned with the intake passage;
   an outer pipe radially spaced from and surrounding said inner pipe;
   a plurality of PTC elements each being inserted between said inner pipe and said outer pipe and having an outer wall and having an inner wall which is in contact with the outer wall of said inner pipe; and;
   insulating means inserted between said inner pipe and said outer pipe and having at least one hole which receives therein one of said PTC elements and has a contour shape substantially equal to that of said PTC elements.

2. A hollow heater vessel according to claim 1, wherein said insulating means comprises a single insulating member surrounding the outer wall of said inner pipe and having a plurality of said holes, said insulating member having a thickness which is thinner than that of said PTC elements.

3. A hollow heater vessel according to claim 2, wherein said insulating member has a plurality of ribs each separating said adjacent holes.

4. A hollow heater vessel according to claim 3, wherein said insulating member has a belt-like shape, and notches are formed on both outer end portions of said ribs for easily bending said insulating member so that it has a polygonal section.

5. A hollow heater vessel according to claim 3, wherein said insulating means comprises a ring portion formed in one piece on said insulating member which cylindrically extends along said ring portion.

6. A hollow heater vessel according to claim 1, wherein said insulating means comprises a plurality of insulating members each having said single hole, said insulating member having a thickness which is thinner than that of said PTC elements.

7. A hollow heater vessel according to claim 1, wherein said inner pipe has an intermediate portion and end portions arranged on each side of said intermediate portion, said intermediate portion expanding inwardly from said end portions, said PTC elements being arranged on said intermediate portion.

8. A hollow heater vessel according to claim 7, wherein said intermediate portion has a polygonal section, and said PTC elements have a flat shape.

9. A hollow heater vessel according to claim 1, wherein said vessel comprises a cylindrical elastic electrode inserted between said outer pipe and the outer walls of said PTC elements.

10. A hollow heater vessel according to claim 9, wherein said electrode is made of graphite.

11. A hollow heater vessel according to claim 9, wherein said electrode has an inner wall having a polygonal section.

* * * * *

UNITED STATES PATENT AND TRADEMARK OFFICE
CERTIFICATE OF CORRECTION

PATENT NO. : 4,398,522

DATED : August 16, 1983

INVENTOR(S) : Yosio Kuroiwa, et al.

It is certified that error appears in the above—identified patent and that said Letters Patent is hereby corrected as shown below:

On the title page:
Change the Name of the Assignee from:

"Toyota Jidosha Kabushiki Kaisha" to

--Toyota Jidosha Kogyo Kabushiki Kaisha--.

Col. 2, line 68, change "carbureter" to --carburetor--.

Col. 3, lines 2, 3 and 5, change "carbureter" to --carburetor--

Col. 8, lines 36 and 68, change "carbureter" to

--carburetor--.

Col. 9, line 7, change "carbureter" to --carburetor--.

Signed and Sealed this

Tenth Day of January 1984

[SEAL]

Attest:

GERALD J. MOSSINGHOFF

Attesting Officer     Commissioner of Patents and Trademarks